United States Patent
Yoon et al.

(10) Patent No.: US 10,367,714 B2
(45) Date of Patent: Jul. 30, 2019

(54) APPARATUS FOR TESTING AND DEVELOPING PRODUCTS OF NETWORK COMPUTING BASED ON OPEN-SOURCE VIRTUALIZED CLOUD

(71) Applicant: ELECTRONICS AND TELECOMMUNICATIONS RESEARCH INSTITUTE, Daejeon-si (KR)

(72) Inventors: Sung Hyun Yoon, Daejeon-si (KR); Tae Heum Na, Daejeon-si (KR); Ho Yong Ryu, Daejeon-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 245 days.

(21) Appl. No.: 15/217,435

(22) Filed: Jul. 22, 2016

(65) Prior Publication Data

US 2017/0317914 A1 Nov. 2, 2017

(30) Foreign Application Priority Data

Apr. 27, 2016 (KR) .......................... 10-2016-0051718

(51) Int. Cl.
*H04L 12/24* (2006.01)
*H04L 12/26* (2006.01)
(Continued)

(52) U.S. Cl.
CPC .......... *H04L 43/50* (2013.01); *G06F 9/45558* (2013.01); *H04L 12/4641* (2013.01);
(Continued)

(58) Field of Classification Search
CPC ..... H04L 41/0806; H04L 41/14; H04L 43/50; H04L 41/22; H04L 41/12; H04L 67/10;
(Continued)

(56) References Cited

U.S. PATENT DOCUMENTS 9,183,121 B2 11/2015 Pruss et al.
9,588,815 B1 † 3/2017 Mistry
(Continued)

FOREIGN PATENT DOCUMENTS

KR 10-2011-0064539 A 6/2011
KR 10-2012-0068279 A 6/2012

*Primary Examiner* — Tu T Nguyen
(74) *Attorney, Agent, or Firm* — LRK Patent Law Firm

(57) ABSTRACT

An apparatus for testing and developing products of network computing based on an open-source virtualized cloud includes a physical space, a network function virtualization (NFV) infrastructure domain space that provides a virtualization function in an independent environment of each user; an NFV engine space that provides a processing based environment for virtual appliances which are units of a virtual network device that is individually operable, a framework space that provides support to allow the virtual appliances to be developed and registered, and a virtual network service space that provides a user interface interoperating with the framework space so that a user configures a virtual network through the user interface and a test function of the configured virtual network is supported.

9 Claims, 7 Drawing Sheets

(51) Int. Cl.
*G06F 9/455* (2018.01)
*H04L 12/46* (2006.01)
*H04L 29/08* (2006.01)

(52) U.S. Cl.
CPC ...... *H04L 41/0803* (2013.01); *H04L 41/0806* (2013.01); *H04L 41/12* (2013.01); *H04L 41/14* (2013.01); *H04L 41/22* (2013.01); *H04L 67/10* (2013.01); *G06F 2009/45595* (2013.01)

(58) Field of Classification Search
CPC ............. H04L 41/0803; H04L 12/4641; G06F 9/45558; G06F 2009/45595
USPC ........................................................ 709/220
See application file for complete search history.

(56) References Cited

U.S. PATENT DOCUMENTS

| | | | |
|---|---|---|---|
| 2011/0258621 A1* | 10/2011 | Kern | G06F 9/5072 |
| | | | 718/1 |
| 2013/0124669 A1* | 5/2013 | Anderson | G06F 11/3006 |
| | | | 709/217 |
| 2014/0164624 A1† | 6/2014 | Ames et al. | |
| 2014/0241247 A1† | 8/2014 | Kempf et al. | |
| 2016/0072669 A1† | 3/2016 | Saavedra | |
| 2017/0300394 A1† | 10/2017 | Raut | |

\* cited by examiner
† cited by third party

APPARATUS FOR TESTING AND DEVELOPING PRODUCTS OF NETWORK COMPUTING BASED ON OPEN-SOURCE VIRTUALIZED CLOUD

CROSS-REFERENCE TO RELATED APPLICATION(S)

This application claims priority to Korean Patent Application No. 10-2016-0051718, filed on Apr. 27, 2016, in the Korean Intellectual Property Office, the disclosure of which is incorporated herein by reference in its entirety.

BACKGROUND

1. Field

The present disclosure relates to an apparatus for testing and developing products of network computing based on a virtualized cloud for easily developing and testing company's services and products by supporting a standard and testing that allow developing a networking solution including network equipment, network service, etc.

2. Description of Related Art

Nowadays, an interest in an open-source based virtualized cloud is gradually increasing for reasons of cost-saving and operational efficiency. In this way, an information communication technology (ICT) environment nowadays is evolving in a direction of saving costs and constituting an efficient infrastructure by grafting a virtualization technology that utilizes an open source onto an existing hardware-based cloud. Due to developments in the virtualization technology, an existing supplier-centered network infrastructure subordinate to hardware is gradually being modified into a form of equipment based on user-centered software. Attempts to drive hardware-based network computing equipment in a form of a virtual server in a general commercial server through virtualization of network computing equipment are constantly being made for the purpose of achieving many advantages including a decrease in operational cost, continuity of service, a decrease in energy consumption, and flexible operation.

A "cloud" is a computer environment in which information is semi-permanently stored on a server on the Internet unless intentionally deleted and is temporarily stored in a client such as an IT device including a desktop computer, a tablet personal computer, a laptop computer, a net-book, and a smartphone and refers to a computing environment in which all information of a user is stored on a server on the Internet and the information can be used anytime and anywhere through various types of IT devices. Flexibility of a cloud environment is gradually increasing by grafting the virtualization technology onto a physical server based operation method of the past.

In a cloud operation, resources such as servers, storages, and networks are required, and software capable of controlling each of the resources and, furthermore, integrally managing and operating the resources is required. Generally, these requirements are referred to as "cloud operating system (Cloud OS)."

As a cloud computing environment becomes widely used, many software companies such as Microsoft, Amazon, and VMware are providing commercial cloud OSes. However, on one hand, with companies leaning toward the open source, an open source cloud OS is being mainly supported by numerous open-source based software companies such as HP and RedHat, and OpenStack is at center stage.

OpenStack is a cloud computing open-source project in the Infrastructure as a Service (IaaS) form and may be viewed as an assembly in which several sub-level open source projects having purposes of controlling available resources of processing, storage spaces, and networking are gathered. Currently, numerous companies are participating in the project.

As an open-source project, operations and developments are performed mainly based on Linux, and anyone can freely participate in the project by orienting toward open design and developments.

Virtualization refers to a technology in which physical features of a computer resource are concealed from ways in which other systems, application systems, and final users interact with the resource. Logical resources are provided to a user by abstracting physical features of a resource, and by this, various advantages in terms of technical management are provided.

Virtualization is proliferating nowadays due to a spread of cloud computing through the Internet and smart terminals and gaining much attention as a vigorous discussion on cloud computing becomes active. Although virtualization is a term that has been used since the 1960's, the importance thereof is further increasing both economically and technically due to the spread of cloud computing. Particularly, the role of ICT, in particular, virtualization, is gradually becoming important in integrating distributed ICT resources of a company and enabling collaborations between workers to improve productivity and mobility due to a spread of smart devices in situations in which a corporate environment rapidly changes and market competition is intensified such that a company cannot survive when the company falls to promptly deal with the market.

This is because, above everything else, access and infrastructure management with respect to computing resources are simplified through virtualization such that the infrastructure can be operated very efficiently. Due to the advantages of virtualization, nowadays, virtualization is not only applied to computer resources like desktop virtualization, server virtualization, and the like but is comprehensively applied to most fields of ICT resources including networks, storages, applications, terminal devices, and so on.

Particularly, network virtualization is a technology that enables an existing networking technology focusing on hardware to be controlled by software means by abstracting computing, server, and network functions. Technologies such as software-defined network (SDN) and network function virtualization (NFV) are settling in as trends of network technologies.

SDN is a technology in which a control function is separated from an existing switch or router and centralized physically or logically, and a traffic transmission operation of a network is controlled and managed using a software (SW)-based controller through an open application programming interface (API). Rather than a virtualization technology, SDN may be viewed as a new network controller capable of controlling network traffic from the center, unlike an existing distributed method, for provision and management of a physical network.

NFV is a technology that virtualizes and uses various software functions required for configuration, control, and management, etc. of a communication network to provide a new network "production environment" for providing low-cost, high-efficiency, and rapid service based on the virtualization technology and is generally executed in an x86-based virtual server. NFV allows a network operator to virtualize existing network hardware equipment through softwarization of network functions and drive the virtualized network functions by embedding the existing network hardware equipment in general-purpose hardware equipment corresponding to a data center, a network node, and subscriber equipment.

For example, although software such as an OS and application programs and hardware were provided together in early-stage computers in the past, as personal computers (PCs) become widely used, various types of OSes such as Windows, Mackintosh, and Linux are operated by being embedded in IBM compatible general-purpose hardware according to a users intention. Likewise, as the NFV advances, various types of software that fit utilization purposes may be installed at general-purpose network equipment, thus expanding beyond existing network equipment in which hardware and software are integrated.

That is, a network function may be implemented by embedding a new software function into a virtual server and the like even without installing new network equipment. Ultimately, NFV allows a network operator to have considerable convenience and save cost in terms of operational management such as network provisioning and failure processing.

Communication service providers who have made efforts to reduce the cost for network operation by removing dependence on particular network equipment vendors and for whom investment cost and operational cost associated with expensive network equipment compared to gradually decreasing revenue have become burdens are behind the advent of the NFV. Particularly, research and development on the NFV are mainly being carried out by mobile communication service providers who bear a relatively high investment cost.

However, a view is dominant in which still more time is seen to be needed for the NFV to be applied to an actual network. An issue in terms of performance is behind the view. Although it is said that there is an advantage in terms of operational management when the NFV is introduced, communication service providers cannot carelessly introduce the NFV since performance capable of substituting existing hardware is not guaranteed. Since stable network operation is important above everything else to communication service providers who operate a commercial network, stability of a network along with the introduction of the NFV must be guaranteed.

Consequently, even though the virtualization technology is said to improve efficiency of system resources and bring convenience in operating a network, predictable performance of a predetermined level compared to an existing hardware-based system has to be guaranteed for the virtualization technology to be applied to an actual network. As one attempt to overcome the performance problem of the virtualization technology, nowadays, a container technology which is a light-weight virtualization technology for more rapid speed and less resource consumption is gaining attention.

A container is a technology for allowing software to be stably operated when the software has moved from one computing environment to another computing environment and is configured using a runtime execution environment in which an application and all dependencies, libraries, other binary and configuration files, etc. required to drive the application are bundled into one package.

Unlike an existing hypervisor-based virtualization technology in which a guest system that may be independently operated from a host system operates on a hypervisor such as VMware, Xen, and Hyper-V that operates on a physical server, the container-based virtualization technology does not virtualize a system but virtualizes an environment capable of driving an application.

Consequently, to operate an application, hardware such as a central processing unit (CPU) and a memory, etc. is virtualized and used independently between virtual machines while an OS and a library are shared. That is, an OS of a host system and an OS of a guest system may be different in the existing virtualization technology, and, typically, the existing virtualization technology is actually utilized much when using different OSes. In contrast, an OS of a guest system is dependent on an OS of a host system in the container-based virtualization technology.

As a result, the hypervisor-based virtualization technology is a "system" virtualization technology, and the container-based virtualization technology is an "application" virtualization technology.

The trend encouraged by the virtualization technology is predicted to expand in all directions in the network industry from backbone network equipment to an end terminal in the future, and ultimately, a fundamental change is predicted to occur in the conventional network paradigm that has been distinguished by types of media and types of lines.

In this situation, although it is also important to develop a new and innovative network function, securing various types of virtualization network service features by changing an existing network function into a virtualized network function (VNF) is an important component of improving competitiveness. In this regard, an importance of providing a test-and-development apparatus as a testing and developing environment that operates in an open-source based virtualized cloud environment to the maximum number of developers permitted by a system capacity with the highest efficiency of system resources is also being emphasized.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The present disclosure provides an apparatus for testing and developing products of network computing based on an open-source virtualized cloud, the apparatus capable of configuring a virtual network by utilizing a virtual network device that operates in an open-source virtualized cloud and developing various network function tests and new functions based on the virtual network.

The present disclosure provides an apparatus for testing and developing products of network computing based on an open-source virtualized cloud that is required and effective in developing a network function virtualization technology to engineers and developers in a network computing field and Individuals related to product and service developments such as product planners.

The present disclosure provides an apparatus for testing and developing products of network computing based on an open-source virtualized cloud that allows developers to overcome temporal and spatial limitations due to a physical environment and approach online according to circumstances to test products and services developed by the developers and develop and test new products and services through the testing.

The present disclosure provides an apparatus for testing and developing products of network computing based on an open-source virtualized cloud that attempts to assist in creating conditions for a virtuous cycle of a development environment that includes development, testing, and commercialization steps by allowing a user to save much time and cost for preparing a new physical test and development environment required for developing a new network function and invest the saved time and cost in developing a new function.

The present disclosure is an apparatus for testing and developing products of network computing based on an open-source virtualized cloud, the apparatus including a physical space configured with base hardware, a network function virtualization (NFV) infrastructure domain space that provides a virtualization function in an independent environment of each user, an NFV engine space that provides a processing based environment for virtual appliances which are units of a virtual network device that may be individually operated, a framework space that provides support to allow the virtual appliances to be developed in a form of a virtual network device (virtual network function: VNF) and be registered in a test-and-development environment through a predetermined authentication process for testing the developed VNFs, and a virtual network service space that provides a user interface interoperating with the framework space so that a user configures a virtual network through the user interface and a test-and-development function of the configured virtual network is supported.

Other features and aspects will be apparent from the following detailed description, the drawings, and the claims.

Figure 1:
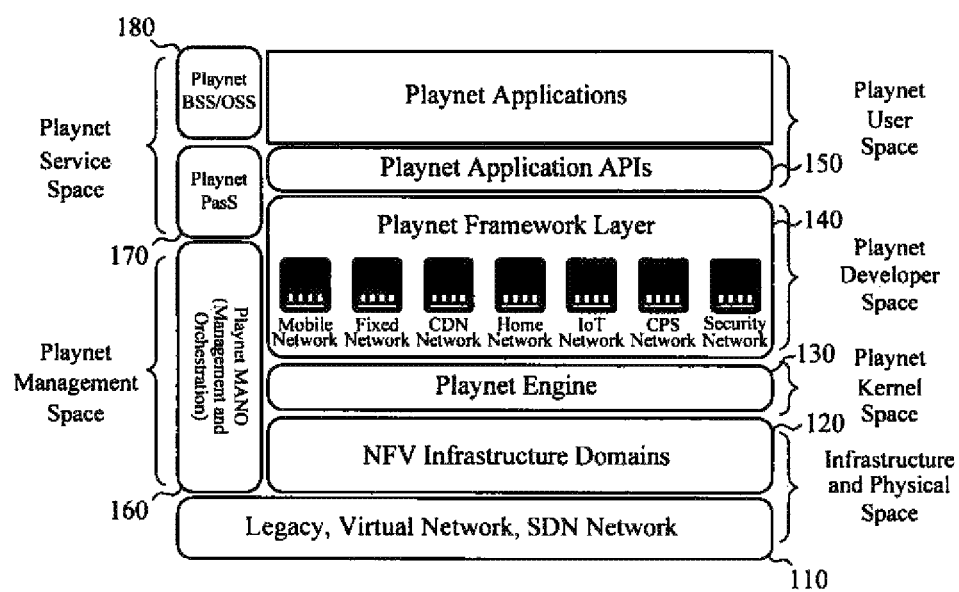
FIG. 1 is an architectural view of an apparatus for testing and developing products of network computing based on an open-source virtualized cloud according to an embodiment of the present disclosure.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Hereinafter, the present disclosure will be described in detail using exemplary embodiments described with reference to the accompanying drawings so that those of ordinary skill in the art can easily understand and reproduce the present disclosure.

In describing the present disclosure, when detailed descriptions of a related known function or configuration is deemed to unnecessarily blur the gist of the embodiments of the present disclosure, the detailed descriptions thereof will be omitted.

Terms used throughout the present specification are those defined in consideration of functions in the embodiments of the present disclosure and may certainly be changed according to intentions, practices, etc. of a user or an operator. Thus, the terms should be defined based on the content throughout the specification of the present disclosure.

FIG. 1 is an architectural view of an apparatus for testing and developing products of network computing based on an open-source virtualized cloud according to an embodiment of the present disclosure. Hereinafter, for convenience of description, the apparatus for testing and developing products of network computing based on an open-source virtualized cloud will be referred to as a future network computing platform (FNCP) Playnet. However, this is merely for convenience of the description, and the present disclosure is not limited thereto.

Referring to FIG. 1, the FNCP Playnet includes a physical space 110, an infrastructure space 120, a kernel space 130, a developer space 140, a user space 150, a management space 170, and service spaces 170 and 180.

Legacy, a virtual network, and an SDN network exist in the physical space 110. That is, to configure a flexible infrastructure apparatus in which it is easy to expand resources, the FNCP Playnet utilizes a virtualized cloud environment as a base infrastructure. As the size of the base infrastructure gradually increases, the structure of an infrastructure based on the FNCP Playnet may gradually expand from a single cloud system to a distributed cloud system, and accordingly, networks that configure the infrastructure would also be diversified.

A network function virtualization infrastructure domain exists in the infrastructure space 120. In this space, an independent network function virtualization (NFV) environment is provided for each user. That is, the infrastructure space 120 is a space that provides computing/networking/storage virtualization function while supporting multi-tenancy. The physical space 110 and the infrastructure space 120 are not directly engaged by a user and are deeply related to an infrastructure operator.

To support the functions mentioned above, the FNCP Playnet utilizes OpenStack which is an open-source cloud OS receiving the most attention. However, since a new version of OpenStack is released every six months, compatibility between versions is not guaranteed. Although IceHouse version is the one currently selected by many companies and stabilized, a virtualization technology based on hypervisors such as a kernel-based virtual machine (KVM) and Xen has been applied thereto. Thus, IceHouse version is inappropriate to also accept a container-based virtualization technology.

Consequently, the OpenStack version applied to the FNCP Playnet is Kilo or higher version to which a container-based virtualization technology such as Docker can be applied. In this way, both of the existing virtualization technology based on hypervisors and the container-based virtualization technology may be utilized.

Consequently, a base environment is provided in a Playnet Engine used in the kernel space 130 so that execution, storage, and transmission of various virtualized appliances provided from the FNCP Playnet are possible. That is, operations of the virtual appliances operated by the FNCP Playnet are managed and interoperated by the kernel space 130.

In a Playnet Framework space which is the developer space 140, various types of virtual appliances exist, and the virtual appliances are developed according to Playnet application development standards and may be officially registered in Playnet store after going through a compatibility test system (CTS) and an authentication process.

By utilizing APIs provided by various virtual appliances (hereinafter, referred to as "vAPP") registered in the FNCP Playnet, users may directly construct a service in a virtualized environment and utilize the service for various purposes. Here, vAPPs are units of a virtual network device that may be individually operated in the FNCP Playnet. The vAPPs exist in a form of a process or a virtual machine according to a type of the virtual network when the FNCP Playnet is driven and are basically configured of profiles, descriptions, operating environments, and sources.

Figure 2:
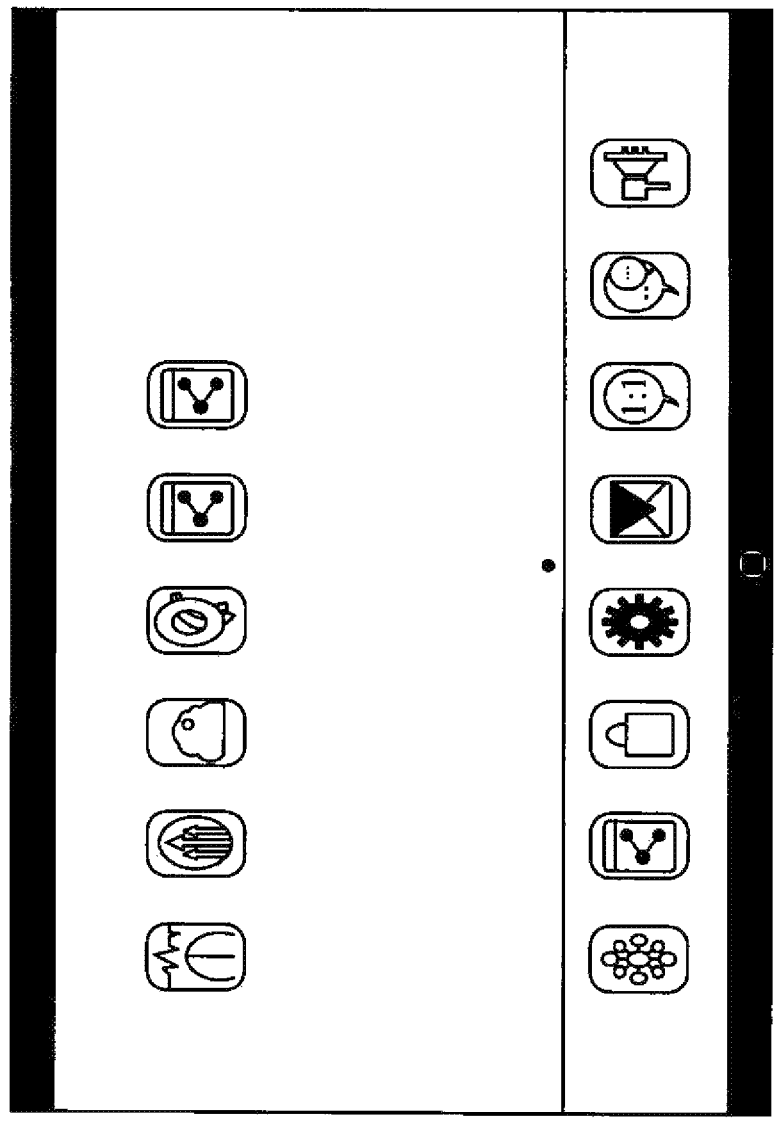
FIG. 2 is a view illustrating an example of a user interface (UI) screen of Platform as a Service (PaaS) that corresponds to a framework space and an application programming interface (API) space of the present disclosure.

FIG. 2 is a view illustrating an example of a user interface (UI) screen of Platform as a Service (PaaS) that corresponds to a framework space and an application programming interface (API) space.

Referring to FIG. 2, the FNCP Playnet operates on an HTML5-based web and thus has high accessibility and is produced similarly to a smartphone mobile OS to provide a friendly and intuitive interface to a user. Each user may be assigned with a virtualized resource and may easily and rapidly configure a desired system or service.

Figure 3:
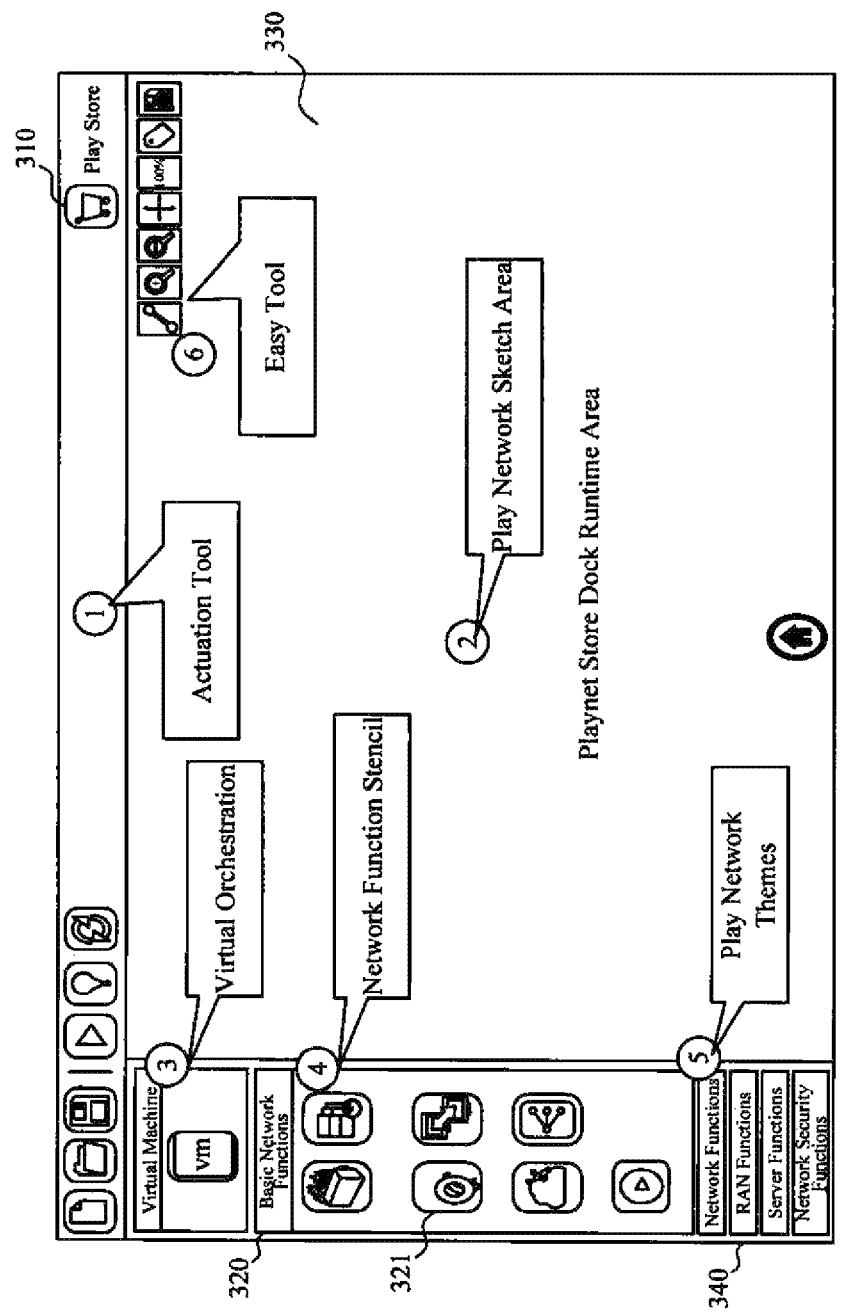
FIG. 3 is a view illustrating examples of a UI/UX which becomes a UI for using the present disclosure and how elements of each UI are related to the structure of the present disclosure.

FIG. 3 is a view illustrating examples of a UI/UX which becomes a UI for using the FNCP Playnet and how elements of each UI are related to the structure of the FNCP Playnet.

Referring to FIG. 3, although, in a UI to be provided to a user, a service is provided in the PaaS form, information has to be exchanged with all spaces for each of the functions to be actually implemented.

The UI of the FNCP Playnet may provide and express vAPPs in forms of icons 321 in a predetermined area 320, and the user may buy the vAPPs from a Playstore 310 which is a public repository for storing various virtual network devices, each with verified marketability (verify through the CTS whether the virtual network devices may be distributed to another user) and also a type of an app store.

That is, the user may utilize existing vAPPs, may create a vAPP with a new function based on a virtual network environment configured based on the existing vAPPs and may also provide the newly-created vAPP to another user.

For this, users may store vAPPs developed by the user in a repository provided by the FNCP Playnet and may register the vAPPs in Playstore through an authentication process to sell the vAPPs to other users. The vAPP development and distribution processes are supported by three types of repositories shown in <Table 1> below.

TABLE 1

| Type of repository | Use |
| --- | --- |
| Private Repository (for each user) | A private vAPP repository basically provided to each user. A vAPP purchased from Playstore is stored and a vAPP developed by the user may also be stored as needed |
| Test Repository (for CTS Procedure) | A repository provided for the purpose of authentication by a manager of the FNCP Playnet. vAPPs stored in this repository are gone through the CTS process by the manager. |
| Public Repository (for Playstore) | vAPPs that have gone through the CTS and authentication procedures in the test repository are stored, and the stored vAPPs are presented in Playstore. |

Upon gaining access to the FNCP Playnet, vAPPs purchased and owned by a user are arranged in the form of icons 321 illustrated at the left of FIG. 3. In this case, a process in which corresponding images of the vAPPs are stored in a private repository of the user is internally performed.

When virtual network devices are present in a private repository of an individual user, the user may configure a virtual network using the virtual network devices.

The user may easily configure a virtual network as if drawing a picture within a predetermined area 330 of an intuitive UI provided by the FNCP Playnet. Since once-configured virtual network settings can be reused afterwards by save and open functions and the like, it is easy to perform testing and development of each version of virtual networks through virtual network settings that gradually evolve.

A virtual network device newly developed by a user may be supplied to the FNCP Playnet. In this case, an operator of the FNCP Playnet determines whether the newly-developed virtual network device can be registered in the Playstore 310 by tests of functions and abnormalities of the virtual network device to be supplied by the user through the CTS and performs subsequent operations depending on the result.

Through the FNCP Playnet, the user may configure various types of virtual networks using various virtual network devices and may develop a new network function by experiencing and performing testing and development of each network function. Types of virtual networks that may be configured using a virtual network device in the open-source based virtual cloud environment may be mainly classified into four types including a virtual network based on a host virtual machine (VM) and a nested VM, a virtual network based on a host VM and a container, a VM-based virtual network, and a container-based virtual network according to how a virtualization technology is applied.

Figure 4:
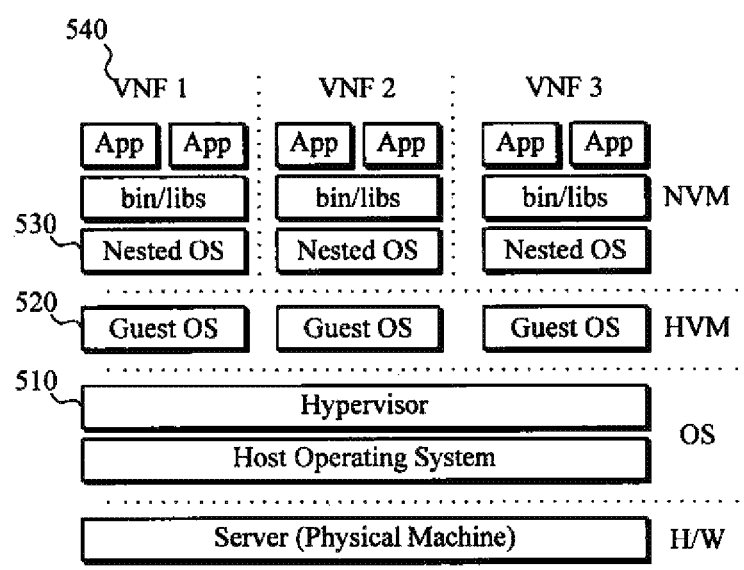
FIG. 4 illustrates a structure of a configuration of a virtual network device according to the present disclosure for configuring a virtual network based on a host virtual machine (VM) and a nested VM.

FIG. 4 illustrates a structure of the FNCP Playnet for configuring a virtual network based on a host VM and a nested VM.

Referring to FIG. 4, the virtual network based on a host VM and a nested VM generates a nested VM in a host VM that operates on a KVM hypervisor and implements a virtual network function in the nested VM to allow the nested VM to serve as a virtual network device. In this case, in implementing a virtual network device, since a kernel of the nested VM can be directly controlled, possibilities are open for developing various functions without a limitation in OSes. On the other hand, due to the hypervisor virtualization, severe resource utilization and performance loss are caused, and many delays are caused also in a VNF instantiation process. That is, the virtual network based on a host VM and a nested VM has a structure including a KVM 510, a guest OS (host VM) 520, a nested OS (nested VM) 530, and a VNF 540, and severe performance degradation has to be accepted for virtualization of this structure.

Figure 5:
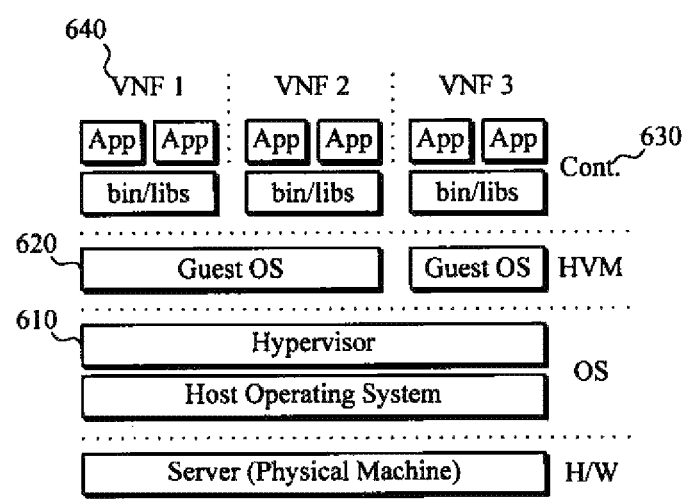
FIG. 5 illustrates a structure of a configuration of a virtual network device according to the present disclosure for configuring a virtual network based on a host VM and a container.

FIG. 5 illustrates a structure of the FNCP Playnet for configuring a virtual network based on a host VM and a container.

Referring to FIG. 5, a virtual network based on a host VM and a container uses a container method which is a method of virtualizing a process in the host VM. This is a lighter approach compared to the nested VM-based virtual network configuration mentioned above, and since performance can be improved by utilizing a container technology of a guest OS and a virtual network can be freely configured in VM units, it is advantageous in terms of management, and a kernel can be directly controlled. However, it is still difficult to deal with a large scale network service (NS) formed of a plurality of VNFs, and furthermore, a problem in performance efficiency caused by the use of hypervisors still remains. That is, the virtual network based on a host VM and a container has a structure including a KVM 610, a gest OS (VM) 820, a container 630, and a VNF 640. The structure is reasonably advantageous in terms of performance improvement and development possibility but has a limitation in maximally utilizing performance of base hardware due to hypervisor virtualization.

Figure 6:
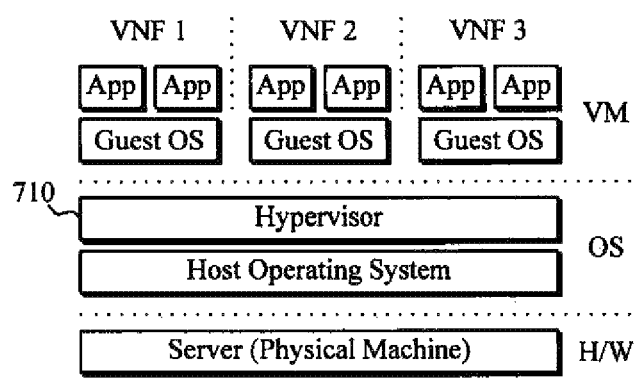
FIG. 6 illustrates a structure of a configuration of a virtual network device according to the present disclosure for configuring a VM-based virtual network.

FIG. 6 illustrates a structure of the FNCP Playnet for configuring a VM-based virtual network.

Referring to FIG. 6, since a VM itself operates as a virtual network device due to an application operating in each VM that operates on a hypervisor 710, a kernel may be directly controlled in a VM-based virtual network. However, there is a drawback in which the hypervisor has to manage each of the virtual networks and virtual network devices.

Figure 7:
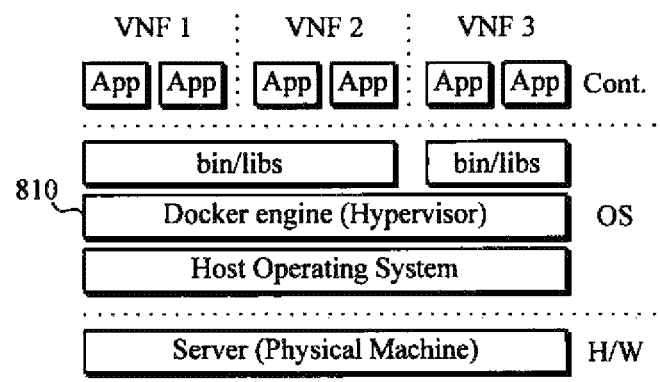
FIG. 7 illustrates a structure of a configuration of a virtual network device according to the present disclosure for configuring a container-based virtual network.

FIG. 7 illustrates a structure of the FNCP Playnet for configuring a container-based virtual network.

Referring to FIG. 7, since a hypervisor 810 itself provides a container-based virtualization technology in a container-based virtual network, performance of hardware may be utilized almost as it is without degradation in the performance. However, it is difficult for a user to directly control a kernel. Further, there is still a drawback in which the hypervisor has to manage each of the virtual networks and virtual network devices.

According to the present disclosure, by configuring a virtual network using a virtual network device, a verification process for settings and operations of various as network function elements can be provided, and the verified settings and operations may be utilized as tools for developing a new networking service. Consequently, an apparatus for testing and developing products of network computing according to the present disclosure may be utilized by various developer groups including domestic medium and small-sized enterprises, one-person businesses, and preliminary startup founders and communities and has the following effects.

By supporting various different types of virtual network devices and virtual networks between the virtual network devices according to a virtualization-based technology, a type of network computing test-and-development environment requested by a user is provided according to benefit standards such as performance and management.

Further, non-experts can also easily perform testing and development through a provision of intuitive UI and UX, and thus the apparatus for testing and developing products of network computing can also be utilized in learning and education related to network function development using a virtual network device.

Further, various virtual network environments can be easily constructed and reused through the same UI and UX, thus adding speed and efficiency to a product development life cycle.

Further, since the apparatus for testing and developing products of network computing can be utilized by various user groups ranging from product planners to beginner/intermediate/advanced level developers, the apparatus for testing and developing products of network computing can be utilized during the entire cycle for developing and supporting products and services including planning, intellectual property rights (IPR), development, test/verification, and distribution.

Consequently, the present disclosure can strengthen competitiveness of products and services by improving development environments of relatively poor domestic small-scale enterprises and thus ultimately contribute to creation of a virtuous cycle of a related industry.

A number of examples have been described above. Nevertheless, it will be understood that various modifications may be made. For example, suitable results may be achieved if the described techniques are performed in a different order and/or if components in a described system, architecture, apparatus, or circuit are combined in a different manner and/or replaced or supplemented by other components or their equivalents. Accordingly, other implementations are within the scope of the following claims.

What is claimed is:

1. An apparatus for testing and developing products of network computing based on an open-source virtualized cloud, the apparatus comprising:
   a physical space;
   a network function virtualization (NFV) infrastructure domain space configured to provide a virtualization function in an independent environment for each user;
   an NFV engine space configured to provide a processing based environment for virtual appliances which are units of a virtual network device that is individually operable;
   a framework space configured to provide support to allow the virtual appliances to be developed and registered in a form of a container; and
   a virtual network service space configured to provide a user interface interoperating with the framework space so that a user configures a virtual network through the user interface and a test function of the configured virtual network is supported,
   a type of a virtual network configurable using a virtual network device is at least one of a virtual network based on a host virtual machine (VM) and a nested VM, a virtual network based on a VM and a container, a VM-based virtual network, and a container-based virtual network, and
   the virtual network based on the host VM and the nested VM generates the nested VM in a host VM that operates on a kernel-based virtual machine (KVM) hypervisor and implements a virtual network function in the nested VM.

2. The apparatus of claim 1, wherein the physical space includes one or more of legacy, a virtual network, and a software defined network (SDN).

3. The apparatus of claim 1, wherein the virtual appliances exist in a form of a process or a virtual machine according to a type of the virtual network and include profiles, descriptions, operating environments, and sources.

4. The apparatus of claim 1, wherein the user interface includes virtual appliances arranged in forms of icons in a predetermined area, an app store configured to store and sell virtual appliances, each with verified marketability, and an area in which a user is able to configure a virtual network using the virtual appliances.

5. The apparatus of claim 4, wherein the virtual network developed by the user is stored in a private repository.

6. The apparatus of claim 4, wherein virtual appliances stored in a test repository are stored in a public repository after going through an authentication process by a manager to be presented in sellable states through the app store.

7. The apparatus of claim 4, wherein the virtual network configured by the user is reused afterwards by functions including save and open.

8. The apparatus of claim 1, further comprising a management and adjustment space configured to interoperate with the NFV infrastructure domain space, the NFV engine space, and the framework space.

9. The apparatus of claim 1, further comprising:
a virtualization infrastructure management unit configured to manage the NFV infrastructure domain space;
a virtualized network function management unit configured to manage a life cycle of an instance of a virtualized network function; and
an adjustment unit configured to manage and adjust a life cycle of a network service, select an infrastructure capable of providing required resources of an optimized virtualized network function by interoperating with the NFV infrastructure domain space, and provide connectivity.

* * * * *